United States Patent
Negri et al.

(10) Patent No.: US 11,230,978 B2
(45) Date of Patent: Jan. 25, 2022

(54) AIRCRAFT TURBINE ENGINE COMPRISING A DISCHARGE DEVICE

(71) Applicant: SAFRAN AIRCRAFT ENGINES, Paris (FR)

(72) Inventors: Arnaud Nicolas Negri, Yerres (FR); Nils Edouard Romain Bordoni, Melun (FR); Michel Gilbert Rolland Brault, Quincy sous Senart (FR); Guillaume Patrice Kubiak, Saint Pierre du Perray (FR); Nathalie Nowakowski, Cesson (FR); Romain Guillaume Cuvillier, Cesson (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 862 days.

(21) Appl. No.: 15/474,943

(22) Filed: Mar. 30, 2017

(65) Prior Publication Data

US 2017/0284306 A1    Oct. 5, 2017

(30) Foreign Application Priority Data

Mar. 31, 2016 (FR) ...................... 1652836

(51) Int. Cl.

| | |
|---|---|
| *F02C 9/18* | (2006.01) |
| *F01D 21/02* | (2006.01) |
| *F02C 3/04* | (2006.01) |
| *F02C 9/46* | (2006.01) |
| *F01D 21/06* | (2006.01) |
| *F02K 3/075* | (2006.01) |
| *F02C 3/13* | (2006.01) |

(52) U.S. Cl.
CPC ............... *F02C 9/18* (2013.01); *F01D 21/02* (2013.01); *F02C 3/04* (2013.01); *F01D 21/06* (2013.01); *F02C 3/13* (2013.01); *F02C 9/46* (2013.01); *F02K 3/075* (2013.01); *F05D 2270/021* (2013.01); *F05D 2270/042* (2013.01); *F05D 2270/091* (2013.01)

(58) Field of Classification Search
CPC ......... F05D 2270/021; F05D 2270/042; F05D 2270/091; F05D 2270/304; F05D 2270/09; F01D 21/02; F01D 21/06; F02C 3/04; F02C 9/18; F02C 9/52
See application file for complete search history.

(56) References Cited

U.S. PATENT DOCUMENTS

| | | |
|---|---|---|
| 3,255,586 A | 6/1966 | Hennig et al. |
| 4,005,575 A | 2/1977 | Scott et al. |
| 6,789,000 B1 * | 9/2004 | Munson, Jr. ............ F01D 19/00 361/51 |

(Continued)

OTHER PUBLICATIONS

French Search Report with English language translation cover sheet, dated Nov. 22, 2016, FR Application No. 1652836.

*Primary Examiner* — Todd E Manahan
*Assistant Examiner* — Sean V Meiller
(74) *Attorney, Agent, or Firm* — Womble Bond Dickinson (US) LLP

(57) ABSTRACT

Aircraft turbine engine, including at least one first compressor, an annular combustion chamber and at least one first turbine, which define a first flow duct for a primary flow. Between the combustion chamber and the first turbine is a device for discharging at least part of the primary flow.

7 Claims, 4 Drawing Sheets

(56) References Cited

U.S. PATENT DOCUMENTS

| | | | |
|---|---|---|---|
| 7,594,403 B2 * | 9/2009 | Cadieux | F01D 17/105 60/782 |
| 8,336,288 B2 * | 12/2012 | Venter | F02C 9/18 60/226.1 |
| 2009/0293449 A1 | 12/2009 | Venter | |
| 2017/0254295 A1 * | 9/2017 | Moster | F02C 9/00 |
| 2019/0301307 A1 * | 10/2019 | Soriano | F01D 21/12 |

* cited by examiner

AIRCRAFT TURBINE ENGINE COMPRISING A DISCHARGE DEVICE

TECHNICAL FIELD

The present invention relates in particular to an aircraft turbine engine comprising a discharge device.

PRIOR ART

The prior art comprises in particular the documents FR-A1-2 983 910 and FR-A1-2 983 911. These documents describe turbine engine discharge devices.

A turbine engine in general comprises, from upstream to downstream, in the direction of flow of the gases, an air inlet, at least one compressor, an annular combustion chamber, at least one turbine, and a combustion gas exhaust nozzle. The compressor, the combustion chamber and the turbine define a first annular flow duct for a primary flow. In the case of a turbine engine or a bypass turbojet engine, a secondary flow flows in a second annular duct which extends around the engine formed by the compressor, the combustion chamber and the turbine, from the air inlet as far as the exhaust nozzle. At least some of the air that passes through the air inlet enters the compressor in order to form the primary flow, which is subsequently mixed with fuel and then burnt in the combustion chamber before being injected into the turbine and then discharged in the nozzle and mixed with the secondary flow, which in general supplies the major part of the thrust of the turbine engine. The secondary flow is generated by a fan located upstream of the turbine engine, in the air inlet in the case of a ducted fan.

In the case of a twin-spool turbine engine, said engine comprises a low-pressure spool comprising a low-pressure compressor rotor and a low-pressure turbine rotor that are interconnected by a low-pressure shaft, and a high-pressure spool comprising a high-pressure compressor rotor and a high-pressure turbine rotor that are interconnected by a high-pressure shaft. The high-pressure compressor and the high-pressure turbine are arranged upstream and downstream, respectively, of the combustion chamber. The low-pressure compressor and the low-pressure turbine are arranged upstream of the high-pressure compressor and downstream of the high-pressure turbine, respectively.

The low-pressure and high-pressure compressors are separated from each other by a casing referred to as the intermediate casing. This intermediate casing in general comprises two annular collars, inner and outer, respectively, that are interconnected by radial arms. The collars define an annular portion of the aforementioned first duct therebetween, and the arms are hollow so as to allow auxiliaries to pass through this duct.

As described in the documents FR-A1-2 983 910 and FR-A1-2 983 911, it is known to equip a turbine engine with a discharge device. This discharge device is provided on an intermediate casing of the turbine engine and makes it possible to discharge part of the primary airflow flowing between the low-pressure and high-pressure compressors. In the present application, air or gas discharge means the removal of air or gas flowing in a duct to the outside of the duct, and in general to another duct (the secondary duct in the aforementioned case). The discharge device of the prior art prevents any risk of surge in the low-pressure compressor when a flow of air greater than that which can be absorbed further downstream by the high-pressure compressor passes through it. This excess airflow is discharged and sent to the secondary flow duct.

Moreover, the occurrence of overspeeding of a turbine engine rotor when a shaft breaks is a very rapid phenomenon and represents a major problem. Detecting overspeeding and cutting off the supply of fuel to the combustion chamber may not be sufficiently quick, which risks resulting in the turbine discs breaking because of the overspeeding.

This phenomenon is a particular problem in the case of a turbine engine comprising a reduction gear, the low-pressure turbine shaft driving the fan shaft by means of a reduction gear. The fan shaft is centred and guided by tapered roller bearings or a combination of a roller bearing and a ball bearing, and the turbine shaft is centred and guided close to the reduction gear by a ball bearing that forms an axial stop and therefore blocks the corresponding shaft in the axial direction. It is necessary to limit the consequences in the event of breakage of each of these shafts.

A technical solution is proposed consisting of providing the vanes of the stator distributors with a zone in the form of an axial deviation of the shape of the vane referred to as "rounded", allowing the turbine rotor, when it retracts when the turbine shaft breaks, to have its movable vanes come into contact with the rounded zone of the vanes of the distributors in order to destroy the blades of the movable vanes of the turbine and thus slow down the rotation of the turbine. This destruction operation is, for this reason, known as "feathering" of the turbine.

This solution has the drawback of not allowing maximum optimisation of the stator vanes, because of the presence of the rounded zones on these vanes. Moreover, this solution allows to stop the turbine only in case of axial movement of the turbine shaft occurring in the event of breakage of this shaft, but not in the event of breakage of the fan shaft or breakage of an internal member of the reduction gear, since this type of breakage does not cause axial movement of the turbine shaft. However, this type of breakage is nevertheless dangerous since it is liable to cause overspeeding of the turbine rotor.

In addition, in the particular case of breakage of the shaft connecting the reduction gear to the fan, overspeeding of the turbine shaft may also risk causing destruction of the reduction gear, which is driven at rotational speeds for which is not designed.

Discharge devices comprising a valve of the flap type that make it possible to discharge the turbine are known from the documents US 2009/293449 A1, U.S. Pat. Nos. 3,255,586 A and 4,005,575 A. However, these devices require specific control in the form of an actuator, which increases the complexity thereof. In addition, none of these devices takes into account the criterion of overspeeding of the turbine.

There is therefore a real need for a solution that makes it possible to solve the problem of overspeeding of a turbine shaft in a simple manner when this overspeeding is due to a breakage of the turbine shaft, but also when this overspeeding is due to the breakage upstream of the fan shaft or of an internal member of the reduction gear, by means of a discharge device of a simple design.

DISCLOSURE OF THE INVENTION

The invention proposes an aircraft turbine engine, comprising at least one first compressor, an annular combustion chamber and at least one first turbine, which define a first flow duct for a primary flow, characterised in that it comprises, between said combustion chamber and said first turbine, a device for discharging at least part of said primary flow comprising, in the primary flow duct, a scooping gate able to be unlocked in order to divert the primary flow in response to the detection of overspeeding.

The invention thus proposes a new implementation of a discharge device, which is used here to limit the supply of combustion gas to the low-pressure turbine. The rotor of the low-pressure turbine is then no longer or not driven by these gases and does not risk overspeeding.

The turbine engine according to the invention may comprise one or more of the following features, taken in isolation from one another or in combination with one another:

the turbine engine is a multi-spool turbine engine comprising at least one low-pressure spool having a low-pressure turbine rotor comprising the first turbine and connected to a low-pressure shaft, and at least one high-pressure spool having a high-pressure compressor rotor and at least one high-pressure turbine rotor having a second turbine, interconnected by a high-pressure shaft, said device being located downstream of the second turbine in the direction of flow of the primary flow, said low-pressure shaft is connected to a fan shaft by means of a reduction gear, said device is supported by a turbine casing, preferably comprising two annular collars, inner and outer, respectively, that are interconnected by substantially radial arms, said device comprises at least one valve or an annular row of valves, the or each valve comprises at least one gate, for example scooping, which is movable between a first position in which it has no influence on the supply of the primary flow to said first turbine, and a second position in which it diverts at least part of the primary flow, which then does not supply the first turbine, preferably radially towards the outside with respect to a longitudinal axis of the turbine engine, the or each gate is designed so as to move from said first position to said second position by pivoting about a shaft, which is preferably substantially tangent to a circumference centred on said longitudinal axis, the or each gate is designed so as to move from said first position to said second position by pivoting radially towards the inside or towards the outside with respect to said longitudinal axis, the or each gate is produced from a material resistant to very high temperatures, for example based on nickel and/or based on a ceramic matrix composite material, the discharge device comprises a means for locking/unlocking the or each gate, the discharge device comprises a means for assisting the opening of the or each gate, in particular a spring, the discharge device comprises a means for controlling the locking/unlocking means, unlocking is achieved by a pyrotechnic, hydraulic, pneumatic and/or electrical means, the discharge device comprises a means for detecting overspeeding of a turbine shaft, said control means being designed so as to control the unlocking of the or each gate in the event of detection of said overspeeding, and the discharge device comprises a means for cutting off a fuel supply to said turbine engine, said control means being designed so as to control the cutting off of fuel in the event of detection said overspeeding.

The present invention also relates to a method for controlling a discharge device of a turbine engine as described above, characterised in that it comprises a first step of measuring a speed of a turbine shaft of the turbine engine, a second step of comparing said measured speed with a predetermined overspeeding threshold value, and, in the event of detection that said measured speed has exceeded said threshold value, a third step of said device controlling the discharge of at least part of said primary flow, and preferably, still in the aforementioned case of said threshold value being exceeded, a fourth step of said device controlling the cutting off of the fuel supply to said combustion chamber.

Finally, the present invention relates to a turbine module for a turbine engine of the type described above, comprising at least the low-pressure turbine rotor and an inter-turbine casing comprising the discharge device.

DESCRIPTION OF THE FIGURES

The invention will be better understood, and other aims, details, features and advantages thereof will emerge more clearly in the course of the following detailed explanatory description of embodiments of the invention, given by way of purely illustrative and non-limitative examples, with reference to the accompanying schematic drawings, in which.

DETAILED DESCRIPTION

Figure 3:
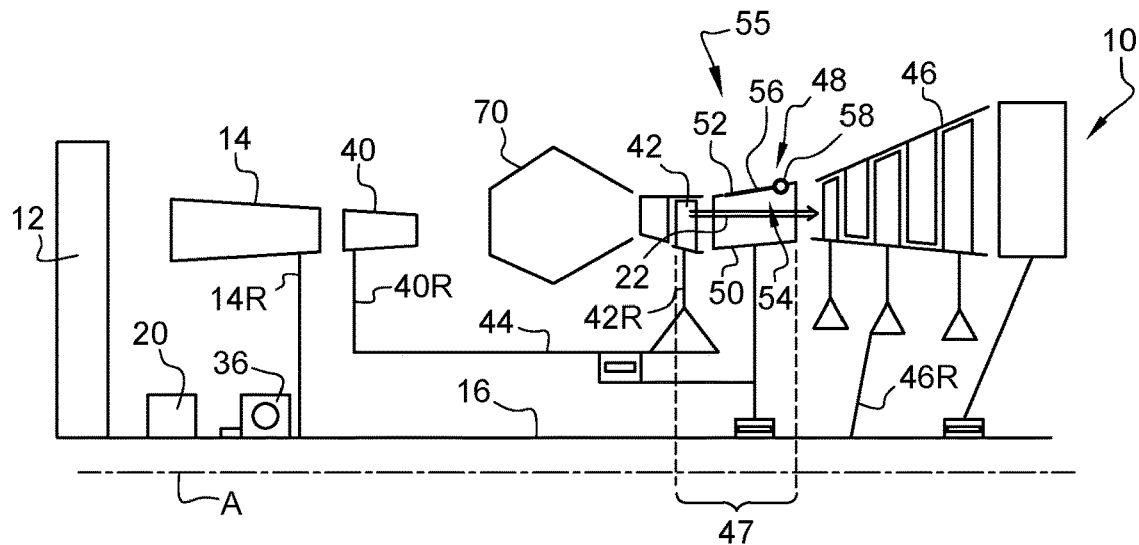
FIG. 3 is a highly schematic longitudinal sectional half-view of a turbine engine according to the invention, equipped with a discharge device in the locked or closed position.
Figure 4:
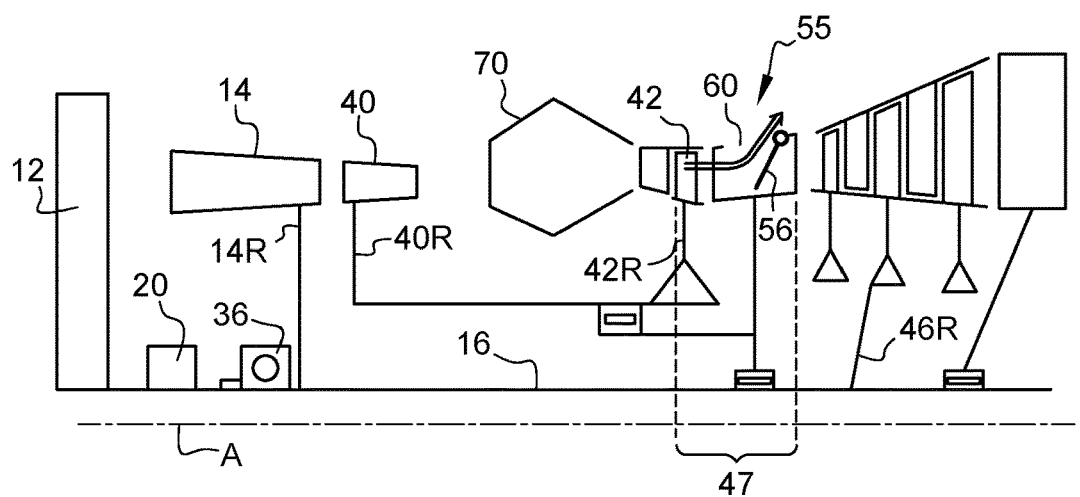
FIGS. 4 and 5 are highly schematic half-views similar to the one in FIG. 3 and showing the discharge device in the unlocked or open position.
Figure 5:
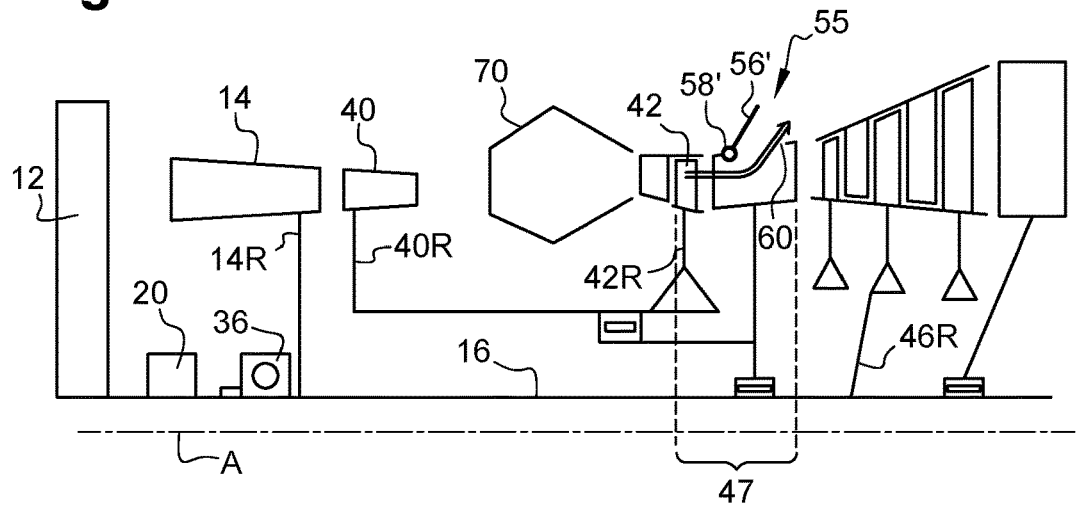

FIGS. 3 to 5 show an aircraft turbine engine 10 produced according to the invention and which in this case is a twin-spool bypass turbojet engine produced according to the invention. The overall architecture of this turbine engine 10 is a conventional twin-spool architecture known from numerous turbine engines known from the prior art. For this reason, in the remainder of the present description, any reference to the general architecture of a turbine engine according to the prior art will be made with reference to FIG. 3.

The configuration of the turbine engine 10 shown in FIGS. 3 to 5 does not limit the invention, and the invention can apply to any type of turbine engine, in particular twin spool.

In a known manner, as illustrated by FIGS. 3 to 5, the turbine engine 10 comprises, from upstream to downstream in the direction of flow of the gas flows F in the turbine engine, a fan 12, a low-pressure compressor 14, a high-pressure compressor 40, an annular combustion chamber 70, a high-pressure turbine 42 and a low-pressure turbine 46.

A rotor 40R of the high-pressure compressor 40 and a rotor 42R of the high-pressure turbine 42 are connected by a high-pressure (HP) shaft 44 and form, together therewith, a high-pressure spool. A rotor 14R of the low-pressure compressor 14 and a rotor 46R of the low-pressure turbine are connected by a low-pressure (LP) shaft 16 and form, together therewith, a low-pressure spool. As illustrated in particular by FIGS. 1 and 2, the fan 12 has blades 13 that are connected to a fan shaft 18 which, in the example shown, is rotatably connected to the LP shaft 16 by means of a reduction gear 20, for example a planetary reduction gear that has been shown here schematically. The fan 12 and the low-pressure compressor 14 thus form an upstream low-pressure module of the turbine engine.

It is advantageous to rotate the fan 12 at a rotational speed lower than that of the LP shaft 16, in particular when it is very large, for the purpose of better adapting it aerodynamically.

The HP and LP shafts 16 extend along a longitudinal axis A of the turbine engine 10.

Figure 1:
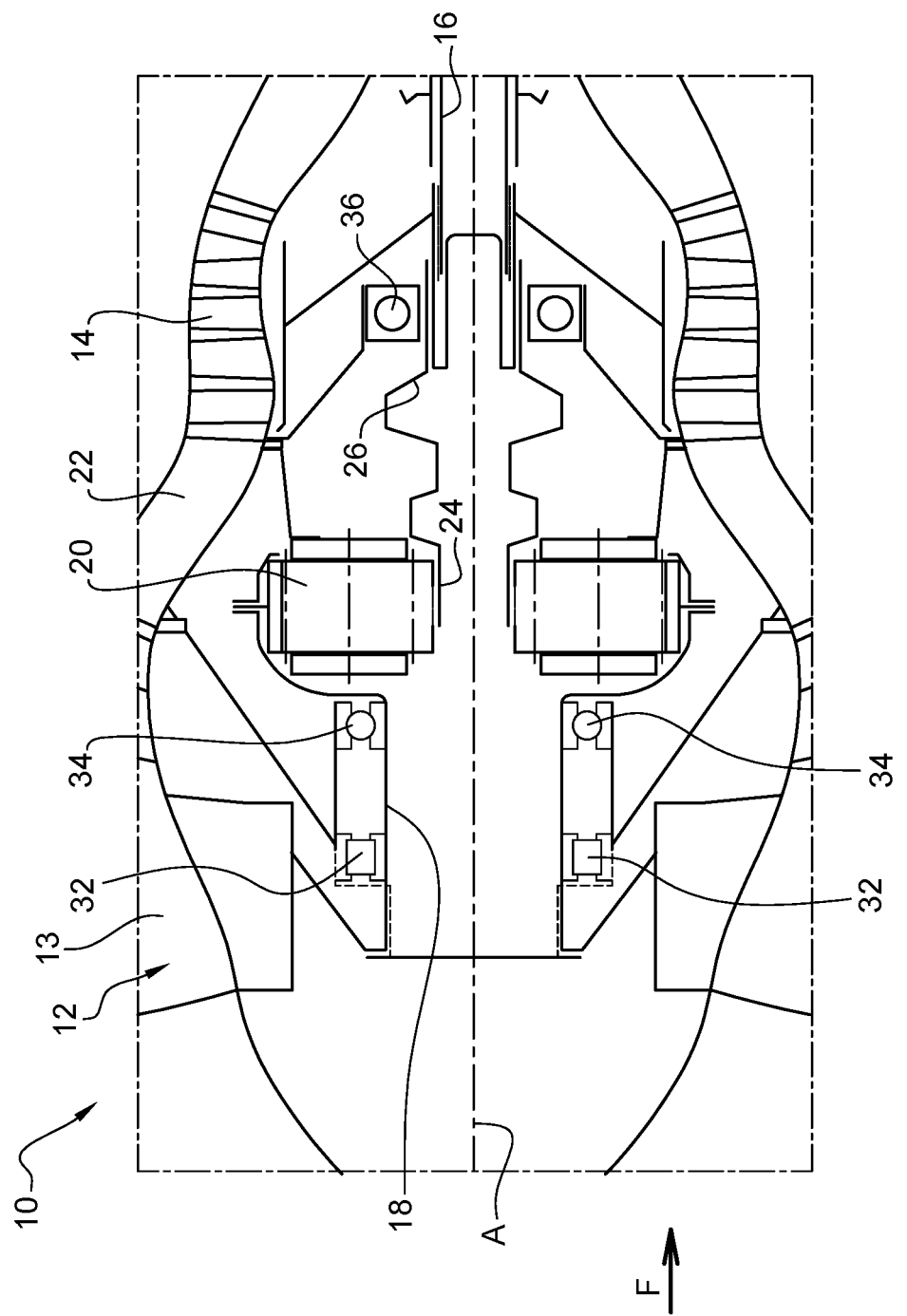
FIG. 1 is a schematic longitudinal sectional view of an upstream part of a first type of turbine engine to which the invention applies.
Figure 2:
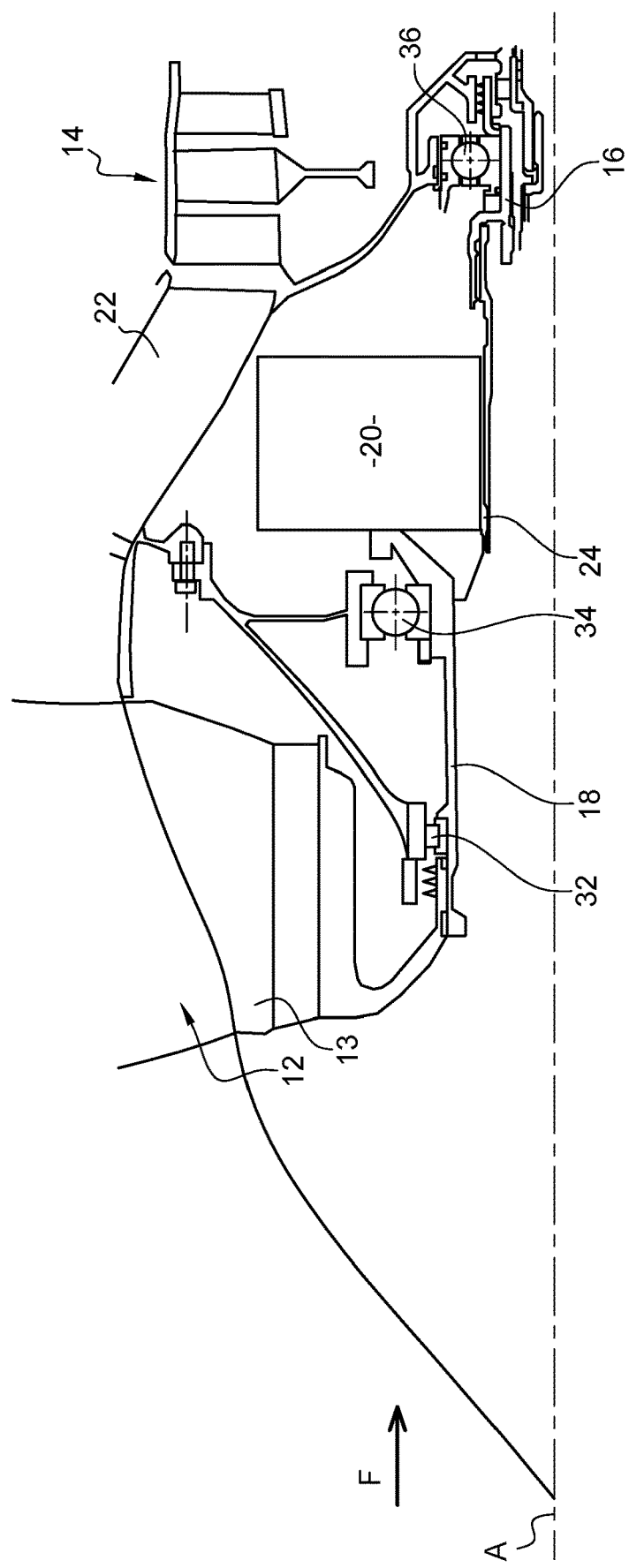
FIG. 2 is a schematic longitudinal sectional view of an upstream part of a second type of turbine engine to which the invention applies.

As illustrated in more detail by FIGS. 1 and 2, the turbine engine 10 also comprises a fan casing (not visible) that extends around blades 13 and defines an air inlet duct for the flows F. Part of this air enters an inner annular flow duct 22 for a primary flow and the other part supplies an outer annular flow duct (not visible) for a secondary flow. As can be seen in FIGS. 3 to 5, the duct 22 passes through the low-pressure 14 and high-pressure 40 compressors, the combustion chamber 70 and the high-pressure 42 and low-pressure 48 turbines. The outer duct (not visible) encloses casings of the compressors and turbines and joins the inner duct 22 in an exhaust nozzle (not visible) of the turbine engine 10.

As illustrated in more detail by FIGS. 1 and 2, the shafts 16, 18 are centred and guided so as to rotate about the axis A by bearings 32, 34, 36. In a first type of turbine engine, shown in FIG. 1, the fan shaft 18 is guided by two tapered roller bearings 32, 34 and, in a second type of turbine engine, shown in FIG. 2, the fan shaft 18 is guided by two bearings 32, 34, of the roller type and the ball type, respectively, the ball bearing 34 preventing axial movements of the shaft 18 and the roller bearing 32 making it possible to supplement the rotational guidance of said shaft without introducing any additional axial stress on said fan shaft 18.

Whatever the type of turbine engine, as illustrated by FIGS. 1 and 2, each LP shaft 16 is guided by at least one ball bearing 36 that forms an axial stop that determines the axial position of the corresponding LP shaft 16 during operation.

In the event of a breakage of the LP shaft 16, the known technology of "feathering" of the low-pressure turbine makes it possible to eliminate the risk of overspeeding. The downstream part of the LP shaft 16 is no longer held by the ball bearing 36 and is therefore free to move axially, which causes destruction of the vanes of the low-pressure turbine 46. The fan shaft 18 is then no longer driven by the LP shaft 16 and therefore does not risk overspeeding.

However, there is currently no effective solution for preventing overspeeding of the LP shaft 16 in the event of breakage of the fan shaft 18. Indeed, in this case, the LP shaft 16 is still held axially by its ball bearing 36 and the aforementioned "feathering" technology is ineffective.

The invention allows to remedy this problem by virtue of a discharge device installed in the region of the turbine of the turbine engine.

FIG. 3 shows an embodiment of the invention that is in this case applied to a twin-spool bypass turbine engine, but it will be understood that the invention can apply to any turbine engine, including a multi-spool turbine engine, such as for example a triple-spool turbine engine.

As described above, the rotors 40R, 42R of the high-pressure compressor 40 and of the high-pressure turbine 42 are connected by the HP shaft 44 and form, together therewith, a high-pressure spool. The rotors 14R, 46R of the low-pressure compressor 14 and of the low-pressure turbine 46 are connected by the LP shaft 16 and form, together therewith, a low-pressure spool. The LP shaft 16 passes axially through the HP shaft 44 which is tubular and is coaxial with said HP shaft 44.

An inter-turbine casing 48 is arranged between the high-pressure 42 and low-pressure 46 turbines. This casing 48 comprises two coaxial annular collars, inner 50 and outer 52, respectively, which are interconnected by substantially radial arms. These radial arms 51 have been shown in particular schematically in FIG. 6, and are preferably tubular.

The casing 48 may be of the TCF (turbine centre frame) type, that is to say a simple casing, the arms 51 of which are then faired solely so as not to cause any loss in the flow, the arms 51 then being used for passage of electric cables or hydraulic pipes, referred to as auxiliaries, and to provide the mechanical strength between the collars 50 and 52, and therefore small in number. Such a casing is then generally followed by a guide vane assembly (not shown).

In a variant, the casing 48 may be of the TVF (turbine vane frame) type, that is to say it fulfils a function of guiding the flow passing through it. For this purpose, the casing comprises arms 51 having an aerodynamic vane profile, which makes it possible to guide the gas flow passing along the pressure face and suction face of said vanes. Since the arms have a guidance function, they have a smaller cross section than the arms of a casing of the TCF type, but are greater in number in order to provide optimum guidance of the flow. Since the arms 51 of a TVF casing have a smaller cross section, each arm allows the passage of a smaller number of auxiliaries than in the case of a TCF casing, the auxiliaries being distributed over a larger number of arms 51.

In the example shown, a device 55 for discharging combustion gas is arranged between the combustion chamber 70 and a first of the turbines, here the low-pressure turbine 46, which is mechanically connected to the shaft 16 and therefore to the fan shaft 18 with respect to the reduction gear 20. This discharge device 54 diverts the gases intended to supply the low-pressure turbine 46 and, in the event of breakage of the fan shaft 18, prevents the LP shaft 16 from overspeeding in the absence of the resisting torque generated by the fan 12.

For this purpose, the discharge device 55 equips a turbine casing, and more particularly the inter-turbine casing 48. The combustion gases are then discharged into the secondary duct. The device 55 is therefore located between the second turbine or high-pressure turbine 42 and the first turbine or low-pressure turbine 46.

It will be understood that, in the case of a turbine engine comprising a higher number of spools, for example a triple-spool turbine engine comprising an intermediate turbine between the high-pressure and low-pressure turbines, the discharge device could be located at various points between the high-pressure and low-pressure turbines, that is to say between the high-pressure turbine and the intermediate turbine, or between the intermediate turbine and the low-pressure turbine.

The device 55 preferably comprises at least one discharge valve 54 and preferably an annular row of discharge valves 54, regularly distributed about the axis A.

Each valve 54 may comprise a gate 56 that is movable between two positions, respectively for closing the duct portion at the casing 48, in order not to discharge any gas, as shown in FIG. 3, and for opening this duct portion in order to discharge combustion gases, as shown in FIG. 4. In the example shown in FIGS. 3 and 4, the gate 56 pivots between these two positions.

It is articulated at one end, here downstream, about a shaft 58 substantially tangent to a circumference centred on the axis A.

It will be understood that this configuration does not limit the invention, and that the gate could pivot about another shaft, for example a radial shaft, or be a sliding gate.

FIG. 3 shows the gate 56 in the aforementioned closed position. The gate 56 is for example supported by the outer collar 52 of the casing 48 and is aligned with this collar, that is to say is substantially parallel to the axis A, so as to seal a discharge opening 60 in this collar.

In the case in FIG. 4, which shows a first variant of the invention, the gate 56 is pivotally mounted so as to be moved radially towards the inside (relative to the axis A) in order to be brought into its open position. It will be understood then that the gate 56 will extend inside the duct counter to the flow of the gases flowing in the duct 22 and will thus promote the removal of the gases by scoop effect. The gate 56 is thus said to be scooping.

In the case in FIG. 5, which shows a second variant of the invention, a discharge device 55' according to the invention comprises a valve 54' produced in the form of a gate 56' that is pivotally mounted so as to be moved radially towards the outside (relative to the axis A) in order to be brought into its open position. Moreover, the gate 56' is here articulated by its upstream end on the casing 48 about a shaft 58' substantially tangent to a circumference centred on the axis A. The difference in pressures between the primary and secondary ducts is sufficient to force the majority of the gases in the primary duct 22 to flow towards the secondary duct.

In the aforementioned two cases, the difference in pressures between the primary and secondary ducts is sufficient to hold the gate 56, 56' in its open position.

The combustion gases to be discharged are relatively hot. The gate 56, 56' is preferably produced from a material resistant to very high temperatures, for example based on nickel and/or based on a ceramic matrix composite material.

Figure 6:
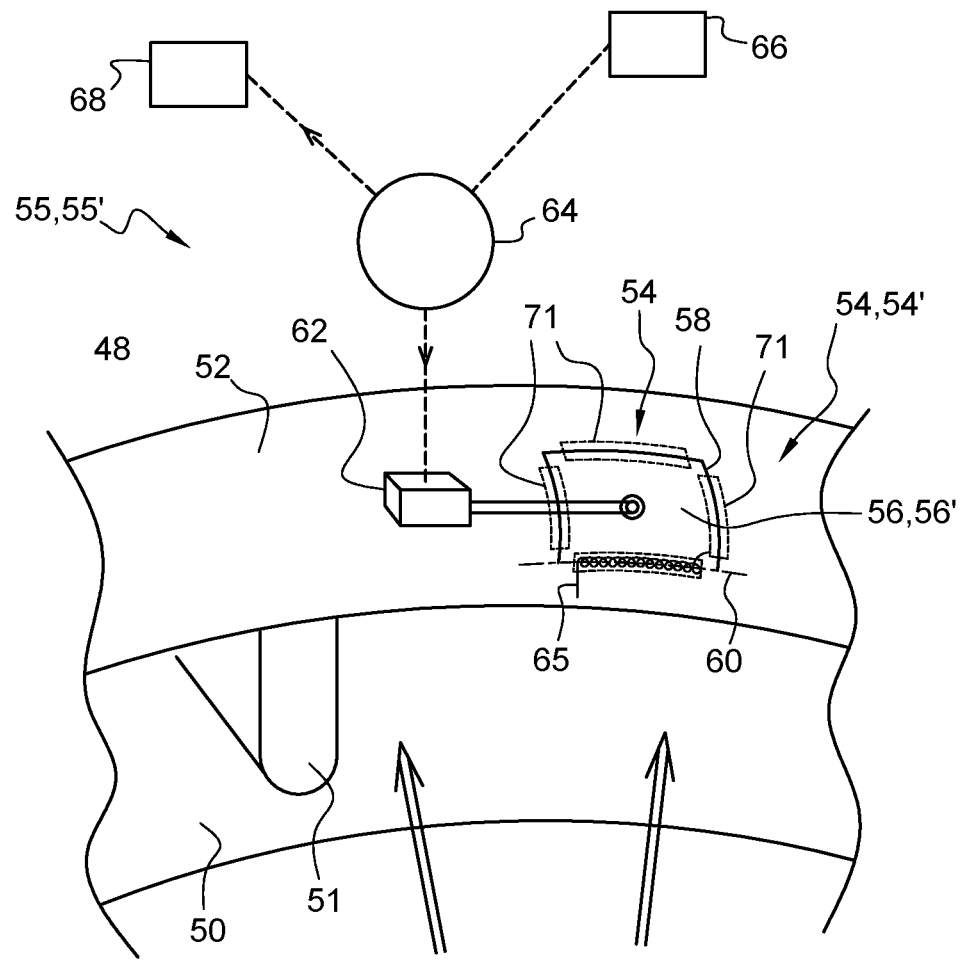
FIG. 6 is a schematic partial perspective view of a turbine casing equipped with a discharge device according the invention.

As shown schematically in FIG. 6, the discharge device 55 or 55' preferably comprises a means 62 for locking/unlocking the gate 56, 56', and a means 65 for assisting the opening of the gate 56, 56', such as a spring. The means 62 is connected to a control means 64 for controlling the unlocking and opening of the gate 56, 56'. This unlocking can be controlled by control means such as pyrotechnic, hydraulic, pneumatic and/or electrical means. The means for locking/unlocking the gate 56, 56' may be a fusible bolt.

The control means 64 is further connected to a means 66 for detecting overspeeding of the LP shaft 16 so as to control the opening of the gate according to the information transmitted by this detection means. This detection means comprises, for example, a sensor 66 that senses the speed of the LP shaft 16 and is able to supply a value N of the speed of the LP shaft 16 that will be compared, by the control means 64, with a threshold value S in order to deduce therefrom whether or not this is a case of overspeeding. Finally, the control means 64 is preferably also connected to a means 68 for cutting off the fuel supply to the combustion chamber 70. In the event of the control means 64 detecting a case of overspeeding, the means 68 is controlled so as to stop the fuel supply to the chamber 70.

To prevent leakages of gas during normal operation of the engine, sealing tongues 71 are interposed here between the peripheral edges of the gate 56, 56' and the peripheral edges of the opening 60 in the collar 52. These tongues 71 are preferably fusible in order to allow the opening of the gate as soon as unlocking thereof is activated. This unlocking preferably reacts very quickly in order to allow the gate 56, 56' to open.

It is known to propose a modular design of turbine engines 10 which makes it possible to assemble said engines in portions. It will thus be understood that the invention may, as illustrated in FIG. 3, advantageously be applied to a turbine module 57 for an aircraft turbine engine 10. In accordance with the invention, this module 57 comprises at least the rotor 46R of the low-pressure turbine 46 and the inter-turbine casing 48 comprising the discharge device 55. This module 57 may advantageously be detached from the rest of the turbine engine 10 in order to be replaced or for the purpose of performing maintenance operations. Preferably, such a module 57 may also comprise a casing 47 of the low-pressure turbine.

Figure 7:
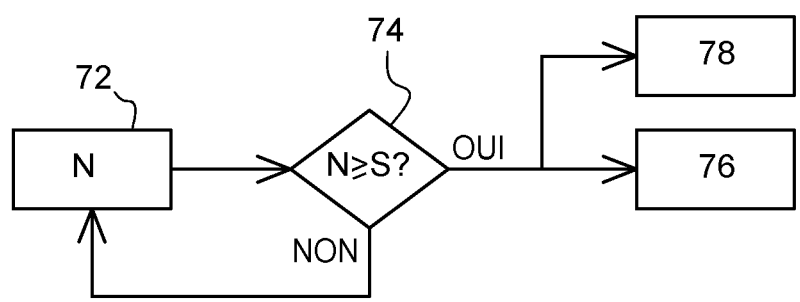
FIG. 7 is a block diagram showing steps of a method according to the invention.

The present invention also relates to a method for controlling the discharge device 55, 55', the steps of which have been shown in FIG. 7.

These steps comprise a first step 72 of measuring a speed N of a shaft 16 of the turbine engine, and then a second step 74 of comparing the measured speed N with a predetermined overspeed threshold value S. In the event of detection that the measured speed N has exceeded the threshold value S (a state represented by the value "YES" at the test N≥S), the method comprises a third step 76 of the device 55, 55' controlling the discharge of at least part of the primary flow by opening the valves 54. 54'. Preferably, the method also comprises, in the event of detection of the measured speed N exceeding the threshold value S (a state represented by the value "YES" at the test N≥S), a fourth step 78 of the device 55, 55' controlling the cutting off of the fuel supply to the combustion chamber 70, by activating the fuel-supply cut-off means 68.

If the speed N does not exceed the threshold S, the device 55, 55' remains in the phase of acquisition of the speed N (a state represented by the value "NO" at the test N≥S).

It will be understood that, in the case where the method is able to control a fourth step 78 of controlling the device 55, 55' with a view to cutting off the fuel supply, the method does not foresee the order in which steps 76 and 78 are performed. In FIG. 6, these steps have been shown as simultaneous, but the fourth step 78 of controlling the means 68 with a view to cutting off the fuel supply could precede the step 76 of controlling the valve or valves 54, 54' of the device 55, 55'. In a variant, the fourth step 78 of controlling the means 68 with a view to cutting off the fuel supply could also follow the step 76 of controlling the valve or valves 54, 54'.

Advantageously, the or each gate 56, 56' is designed so as to allow the majority of the gases emerging from the high-pressure turbine 42 to escape. A proportion of the gases will no doubt continue to pass through the low-pressure turbine 46 but will be sufficiently small to prevent overspeeding of the LP shaft 16.

In particular, even in the variant of the method where the fourth step 78 of controlling the supply cut-off means 68 follows the step 76 of controlling the valves 54, 54', the proportion of the combustion gases that will not have been diverted by the device 55, 55' and which will continue to pass through the low-pressure turbine 46 will also be sufficiently small to prevent overspeeding of the LP shaft 16, for as long as the fuel cut-off occurs and stops the supply of power to the chamber 70.

Although the invention has been described in relation to a particular type of twin-spool turbine engine, it could apply to any other type of turbine engine.

The invention claimed is:

1. An aircraft turbine engine, comprising at least one first compressor, an annular combustion chamber and at least one first turbine, which define a first flow duct for a primary flow, wherein said aircraft turbine engine comprises, between said combustion chamber and said first turbine, a discharge device for discharging at least part of said primary flow, said discharge device comprising at least one valve or an annular row of valves, the or each valve comprising at least one scooping gate which is movable between a first position, in which said scooping gate has no influence on the supply of primary flow to said first turbine, and a second position, in which said scooping gate diverts at least part of the primary flow, which then does not supply the first turbine, radially towards the outside with respect to a longitudinal axis of the turbine engine, wherein the discharge device comprises a means for locking/unlocking the or each gate, a means for controlling said locking/unlocking means, and a means for assisting the opening of the gate.

2. The aircraft turbine engine according to claim 1, wherein the turbine engine is a multi-spool turbine engine comprising at least one low-pressure spool comprising a low-pressure turbine rotor comprising the first turbine and connected to a low-pressure shaft, and at least one high-pressure spool comprising a rotor of a high-pressure compressor and a rotor of a high-pressure turbine comprising a second turbine that are interconnected by a high-pressure shaft, said discharge device being located between the first and second turbines.

3. The aircraft turbine engine according to claim 1, wherein said discharge device is supported by a turbine casing, comprising two annular collars, inner and outer, respectively, that are interconnected by substantially radial arms.

4. The aircraft turbine engine according to claim 1, wherein each gate is designed so as to move from said first position to said second position by pivoting about a shaft that is substantially tangent to a circumference centered on said longitudinal axis.

5. The aircraft turbine engine according to claim 1, wherein the discharge device comprises:
at least one means for detecting overspeeding of a turbine shaft, said control means being designed so as to control the means for unlocking the or each gate in the event of detection of said overspeeding.

6. A method for controlling a discharge device of said aircraft turbine engine according to claim 5, wherein said method comprises a first step of measuring a speed of a turbine shaft of the turbine engine, a second step of comparing said measured speed with a predetermined overspeed threshold value and, in the event of detection of said measured speed exceeding said threshold value, a third step of said discharge device controlling the discharge of at least part of said primary flow with the control means controlling the means for unlocking the or each gate.

7. A turbine module for an aircraft turbine engine according to claim 1, wherein said turbine module comprises at least a rotor of a low-pressure turbine comprising the first turbine and an inter-turbine casing comprising the discharge device.

* * * * *